United States Patent Office 3,057,098
Patented Oct. 9, 1962

3,057,098
PRINTING THERMOPLASTICS
Henry Gabriel, Bartlesville, Okla., assignor to Phillips Petroleum Company, a corporation of Delaware
No Drawing. Filed July 7, 1958, Ser. No. 746,628
8 Claims. (Cl. 41—26)

This invention relates to solid polymers of polymerizable monomers containing a sole ethylenic unsaturation. In one aspect, this invention relates to printing solid polymers of 1-olefins. In one particular aspect, this invention relates to imprinting polyethylene.

Polymers of monomers containing a sole ethylenic unsaturation especially polyethylene, have long been used for film for wrapping food stuffs, various packages and the like. Such polymers have also been used for preparing various objects such as sheets by lamination, compression molding or extrusion as well as the formation of other useful objects by injection molding or vacuum forming and the like. With such film it is frequently desirable to have printed thereon certain advertising matter, identifying information and the like. It is frequently desirable to print certain designs or the like on molded polymeric objects. However, such printing on polymers has been difficult and many techniques have been developed for improving the dye or ink receptivity of such polymers. While most of these techniques have shown some improvement, in many instances much is left to be desired.

It is an object of this invention, therefore, to provide a means for printing on polymeric compositions.

It is another object of this invention to provide a color fast imprint on polymeric objects.

Still other objects, features and advantages of this invention will be apparent to those skilled in the art from this specification and claims.

According to this invention the surface of a solid polymer is punctured with a needle and coloring matter placed in the resulting indentation. In a preferred embodiment, the surface is resealed by application of heat.

The starting polymers for the process of this invention are solid polymer of monomers containing a sole $CH_2=C<$ unsaturation and will be referred to herein as ethylenic unsaturated monomers. The preparation of solid polymers from such olefins is known in the art. Many such methods frequently result in a mixture of solid, semi-solid and liquid polymers, however, the liquid and/or semi-solid material can be removed by various extraction methods such as by use of a hydrocarbon solvent and the solid polymer recovered. These solid polymers can then be formed into film, sheets or other desired form by various molding techniques and the like. Although the method of this invention is applicable for printing solid polymers of these ethylenic unsaturated monomers broadly, the invention is particularly applicable to those polymers of aliphatic 1-olefins of 2–8 carbon atoms per molecule and having no branching nearer the double bond than the 4 position and the polymer having a density of at least 0.89 and a crystallinity of at least 50 percent as determined by nuclear magnetic resonance at ambient temperature such as those polymers prepared by various catalytic methods.

The method of this invention is applicable to polymers of ethylenic unsaturated monomers broadly. These polymers can be homopolymers or copolymers and are normally solid thermoplastic materials. Examples of suitable monomers include styrene, isobutylene, vinyl chloride, vinylidene chloride, vinyl ketones, vinyl ethers, acrylonitriles, acrylic and methacrylic acids, acrylates, methacrylates and the like. The polymers particularly applicable in the process of this invention are those normally solid polyolefins prepared by polymerizing a major amount, preferably at least 90 weight percent, of a 1-olefin of 2 to 8 carbon atoms, having a sole ethylenic unsaturation and having no branching nearer the double bond than the 4-position, and even more preferably the polymer is polyethylene or a copolymer of a major proportion of ethylene with one or more such 1-olefins. Such polymer will be referred to herein as ethylene polymers. Examples of the preferred 1-olefins include ethylene, propylene, 1-butene, 1-pentene, 1-hexene, 1-octene, 4-methyl-1-pentene, 4-methyl-1-hexene, 5-methyl-1-heptene, 6-methyl-1-hexene, 4-ethyl-1-hexene, 4,5-dimethyl-1-hexene, and the like. These olefins can be polymerized with each other and with other olefins such as butene-2, pentene-2, and the like, or with other ethylenic unsaturated monomers of the type previously described.

These polymers can be prepared by any method known to the art, e.g., emulsion polymerization, solution polymerization, gas phase polymerization, liquid phase polymerization, etc. Those skilled in the art will recognize that certain types of polymerization are better adapted to some monomers than to others. The preferred 1-olefin polymers can be prepared by many known methods, such as the older well known high pressure polymerization of such 1-olefins as ethylene, as is disclosed by Fawcett et al., in U.S. Patent 2,153,533. Preferably, the 1-olefin polymer will be one produced by one of the newer low pressure catalytic methods as is described in U.S. Patent 2,825,721, Hogan et al.

According to the Hogan et al. patent, polymers are produced by polymerizing 1-olefins having a maximum chain length of 8 carbon atoms and no branching nearer the double bond than the 4-position by contacting with a solid catalyst, containing as an essential catalytic ingredient, chromium oxide associated with at least one porous oxide selected from the group consisting of silica, alumina, zirconia and thoria. Liquid phase or vapor phase operation can be employed. A highly satisfactory method involves contacting the monomer in the presence of the hydrocarbon diluent, in liquid phase, with a suspended, comminuted catalyst of the type described by Hogan et al. It is preferred that the chromium content of the catalyst be in the range 0.5 to 10 weight percent and that an appreciable proportion of the chromium be in the hexavalent state, e.g., 0.1 to 5 weight percent of the catalyst be hexavalent chromium. This catalyst is generally activated under non-reducing conditions, preferably by contacting with an oxidizing gas such as air, at high temperature, e.g., 700 to 1000° F., prior to use. By one method of operation, the polymerization is carried out in a solvent such as cyclohexane at a temperature above the solution temperature of the polymer being formed, e.g., 250 to 375° F. In a method described in the co-pending application of Leatherman and Detter, Serial No. 590,567, filed June 11, 1956, the polymerization is carried out in a diluent such as pentane at a temperature below the solution temperature thereby forming polymers as discrete particles. In any case, the polymer is separated from the diluent by filtration, flashing of solvent, steam distillation, or the like. Polymers produced by such a process will ordinarily have a molecular weight in the range 35,000 to 100,000, a density in the range 0.95 to 0.97, e.g., approximately 0.96, and a crystallinity in the range 90 to 95 percent at ambient temperatures as determined by nuclear magnetic resonance. The polymer ordinarily has a crystalline freeze point in the range 245 to 265° F. and a softening point of about 260° F. or higher. The difference between crystalline freeze point and softening point is due to the difference in method by which these values are obtained as is known by those skilled in the polymer art. Polymers produced by this process have unsaturation which is preponderantly of the terminal vinyl and/or trans-internal structure. So called "branched vinyl" unsaturation is substantially absent. These terms are more fully discussed in the cited Hogan et al. patent.

Another suitable (but less preferred and non-equivalent) method of preparing highly crystalline polymers is by polymerizing such olefins by contacting with catalyst such as a mixture of a compound represented by the formula $AlR_3$ wherein R is a saturated aliphatic, cycloaliphatic or aromatic hydrocarbon radical or hydrogen: and a second component which is ordinarily a halogen compound of a metal such as titanium, zirconium, chromium or molybdenum. Another suitable catalyst comprises a mixture of a compound represented by the formula $RmAlXn$ wherein R is a hydrocarbon as above, X is a halogen and $m$ and $n$ should each be at least 1 and $m+m=3$, i.e., the valence of aluminum. Along with this latter type of catalyst, metal compounds such as titanium dioxide, tetralkoxides of titanium, halides of titanium, as well as tetravalent titanium salts of organic carboxylic acids can be utilized. The polymerization reaction with these catalysts is ordinarily conducted at a temperature in the range from room temperature up to approximately 300° C. The reaction is preferably conducted with the olefin in admixture with a hydrocarbon such as isooctane, cyclohexane or toluene which is inert and non-deleterious to the catalyst under the reaction conditions. The pressure is ordinarily sufficient to maintain the inert hydrocarbon in substantially the liquid phase. The reactor effluent is ordinarily treated with a compound, such as methanol, acetone, acetic acid or water which decomposes the remaining catalyst and the polymer is recovered by vaporization of the hydrocarbon solvent or by precipitation of the polymer by cooling. Polyethylene produced with this general type of catalyt will have molecular weights of the same order as those produced by the chromium oxide catalyst, crystallinities of 80 to 85 percent and densities of about 0.94.

Still another method of forming such polymers is to liquefy the monomer by low temperature and high pressures and to carry out the polymerization in liquid phase.

As has been indicated, an object prepared from a polymer of an ethylenic unsaturated monomer has its surface punctured with a needle and coloring matter placed in the resulting punctures or indentations. This can be accomplished by several methods. A preferred method is to puncture the polymer with a hollow needle containing the coloring matter. By so operating, the printing is accomplished in one step. By still another method, the outside surface of the needle can be coated with coloring matter, e.g., a fluid ink or dye. When the polymer surface is punctured, the fluid flows onto the polymer and when the needle is withdrawn, it runs down into the depression left by the needle. Where the polymer object is thin such as film, the film can be placed over an ink or dye supply and the needle passed through the film into the ink supply picking up ink and the film colored as the needle is withdrawn. In still another embodiment, the polymer surface can be punctured by the needle and pigment or ink rubbed into the puncture marks. It is of course, within the scope of this invention to use a plurality of needles prearranged in a desired design so as to print the polymer with the said design. These needles can print with the same colors or different colors as desired. One preferred method of operation comprises using hollow needles arranged in a predetermined manner and different sets of needles being supplied with different colored inks.

In a preferred method of operation, the polymer surface is heated to its softening point and on cooling at least a portion of the coloring matter is embedded into the polymer surface. This can be accomplished, for example, by the use of a heated needle, or by subsequently heat treating the object after the coloring matter has been deposited. The heat treating step can be accomplished by exposing the article to heat until the surface reaches a temperature at least as high as the softening point of the polymer. In the case of film or sheet, the polymer can be passed between heated rolls. Other objects, as well as sheets and film, can be exposed to radiant heat directed at the surface, can be placed in an oven, be contacted with a hot iron or otherwise heat treated as desired.

Any coloring matter can be used. For example pigment or dyes can be used. The pigment can be suspended in fluid, e.g., printing ink, or can be applied in dry state such as by pressing into the puncture left by needle. In general, both pigment and dyes will be applied suspended or dissolved in a liquid since they can be more readily applied.

To illustrate the operability of this invention, several runs were made wherein the polymer was printed with ink.

*Example I*

A sheet of about ⅛ inch thick and prepared from a 90/10 copolymer of propylene and ethylene prepared in the presence of titanium trichloride and triisobutylaluminum catalyst and having a density of 0.885, a melt index of 0.584 and a crystalline freeze point of 243° F. was printed by means of straight pin supplied with ink from a commercial ink pad containing blue ink. By one method, the pin was first inserted in the ink pad and then pushed through the polymer. A clear imprint was made in a series of such punctures. In a second method, the same copolymer was printed by placing a piece of tissue paper over the ink pad, laying the sheet on the paper and penetrating the polymer and paper with a solid needle into the ink pad and pulling ink back into the puncture of the polymer sheet as the needle was withdrawn. A clear imprint was produced.

*Example II*

A second sheet of copolymer of the type described in Example I was imprinted by the second method described in that example. This sheet was then heated from the flame of a match until the film became soft and the sheet then cooled. The imprint could then not be rubbed or washed off.

*Example III*

A bottle prepared from a polyethylene prepared in the presence of chromium oxide on silica alumina support catalyst as described by the cited Hogan et al. patent, was imprinted by partially puncturing the bottle, e.g., penetrating only the surface, with a straight pin which was coated with ink by dipping into a stamp pad. The ink impression was left in the indentation made.

The above examples are given to teach the art how this invention can be used and are not to be interpreted as being limiting either in materials used or operating conditions. Those skilled in the art will see many modifications which can be made without departing from the spirit or scope of this invention.

I claim:

1. A method of imparting a color fast imprint to a non-porous surface of a thermoplastic polymeric object prepared from a polymer of a monomer containing a sole ethylenic unsaturation which comprises penetrating the surface of said object with a needle, depositing coloring matter into the resulting depression, thereafter heating the surface of said object to at least its softening temperature and thereafter cooling the surface of said object thereby embedding at least a portion of said coloring matter in the surface of said object.

2. A method of imprinting a non-porous surface of a thermoplastic prepared from a polymer of a monomeric material containing a sole ethylenic unsaturation which comprises heating the surface of said object to at least the softening temperature of same, penetrating the surface of said object with a hollow needle, supplying ink through said hollow needle to said object during penetration thereof by said needle and withdrawing said needle.

3. A method of imprinting a non-porous surface of a thermoplastic polymeric object which is prepared from a polymer of a monomeric material containing a sole ethylenic unsaturation which comprises penetrating the surface of said object with a hollow needle which is at a temperature above the softening temperature of said thermoplastic polymer, supplying ink through said hollow needle to said object during penetration thereof by said needle and withdrawing said needle.

4. A method of imprinting a non-porous surface of a thermoplastic polymeric object prepared from monomers containing a sole ethylenic unsaturation which comprises passing a needle through a sheet of said thermoplastic polymer, treated to be soft to above the softening point thereof, to cool subsequent said penetration into a supply of coloring matter and withdrawing said needle from said supply through said sheet to leave a deposit of said coloring matter on the polymer surrounding the penetration and thereafter cooling said thermoplastic object subsequent to said penetration.

5. A method of imparting a design to a non-porous surface of an object of a thermoplastic polymer prepared from a monomer containing a sole ethylenic unsaturation which comprises penetrating the surface of said polymeric object with a plurality of needles arranged in predetermined position, supplying coloring matter to the polymer surrounding the resulting penetration by the penetrating needles, and heating the surface of said thermoplastic object to above the softening point of said thermoplastic to thereby seal at least a portion of coloring matter supplied to each penetration therein.

6. The method of claim 1 wherein the thermoplastic polymer is a polymer of an aliphatic 1-olefin of 2 to 8 carbon atoms per molecule.

7. The method of claim 1 wherein the thermoplastic polymer is polyethylene.

8. The method of claim 1 wherein the thermoplastic polymer is a copolymer of ethylene and propylene.

References Cited in the file of this patent

UNITED STATES PATENTS

| | | |
|---|---|---|
| 976,225 | Stevens | Nov. 22, 1910 |
| 1,374,329 | Smith | Apr. 12, 1921 |
| 1,481,017 | Lipoti | Jan. 15, 1924 |
| 2,485,323 | Schwartz | Oct. 18, 1949 |
| 2,511,552 | Stuempges | June 13, 1950 |
| 2,596,546 | Grimes | May 13, 1952 |
| 2,936,209 | Dombrowski et al. | May 10, 1960 |